United States Patent [19]

Murphy

[11] Patent Number: 5,020,884
[45] Date of Patent: Jun. 4, 1991

[54] OPTICAL CELL
[75] Inventor: Kenny P. Murphy, Ellisville, Mo.
[73] Assignee: McDonnell Douglas Corporation, St. Louis, Mo.
[21] Appl. No.: 466,004
[22] Filed: Jan. 16, 1990
[51] Int. Cl.⁵ .......................... G02B 5/23; G02B 5/00; G02B 26/02; G02B 5/24
[52] U.S. Cl. .................................. 350/354; 350/319; 350/267; 350/312
[58] Field of Search ............... 350/354, 319, 267, 312, 350/1.5

[56] References Cited
U.S. PATENT DOCUMENTS

| | | | |
|---|---|---|---|
| 3,614,211 | 10/1971 | Letter | 350/312 |
| 3,711,189 | 1/1973 | Novotny et al. | 350/312 |
| 4,288,953 | 9/1981 | Whiteford | 350/312 |
| 4,337,998 | 7/1982 | Basiulis | 350/312 |
| 4,521,077 | 6/1985 | Minahan | 350/312 |

Primary Examiner—Rolf Hille
Assistant Examiner—Robert P. Limanek
Attorney, Agent, or Firm—Benjamin Hudson, Jr.; Guy R. Gosnell

[57] ABSTRACT

There is provided by this invention an optical filter comprised of a transparent housing having an inner cavity with frosted sides that diffuse and scatter incident light beams. For transmission of light the cavity is filled with an index of refraction matching fluid which offsets the diffusing and scattering effect of the frosted surfaces to make the optical filter appear optically clear at a predetermined frequency. The fluid has a vaporization coefficient wherein at excessive energy levels the fluid vaporizes and escapes from the orifice such that the high energy light beams are diffused and scattered so that the shutter prevents transmission of high energy light beams.

4 Claims, 1 Drawing Sheet

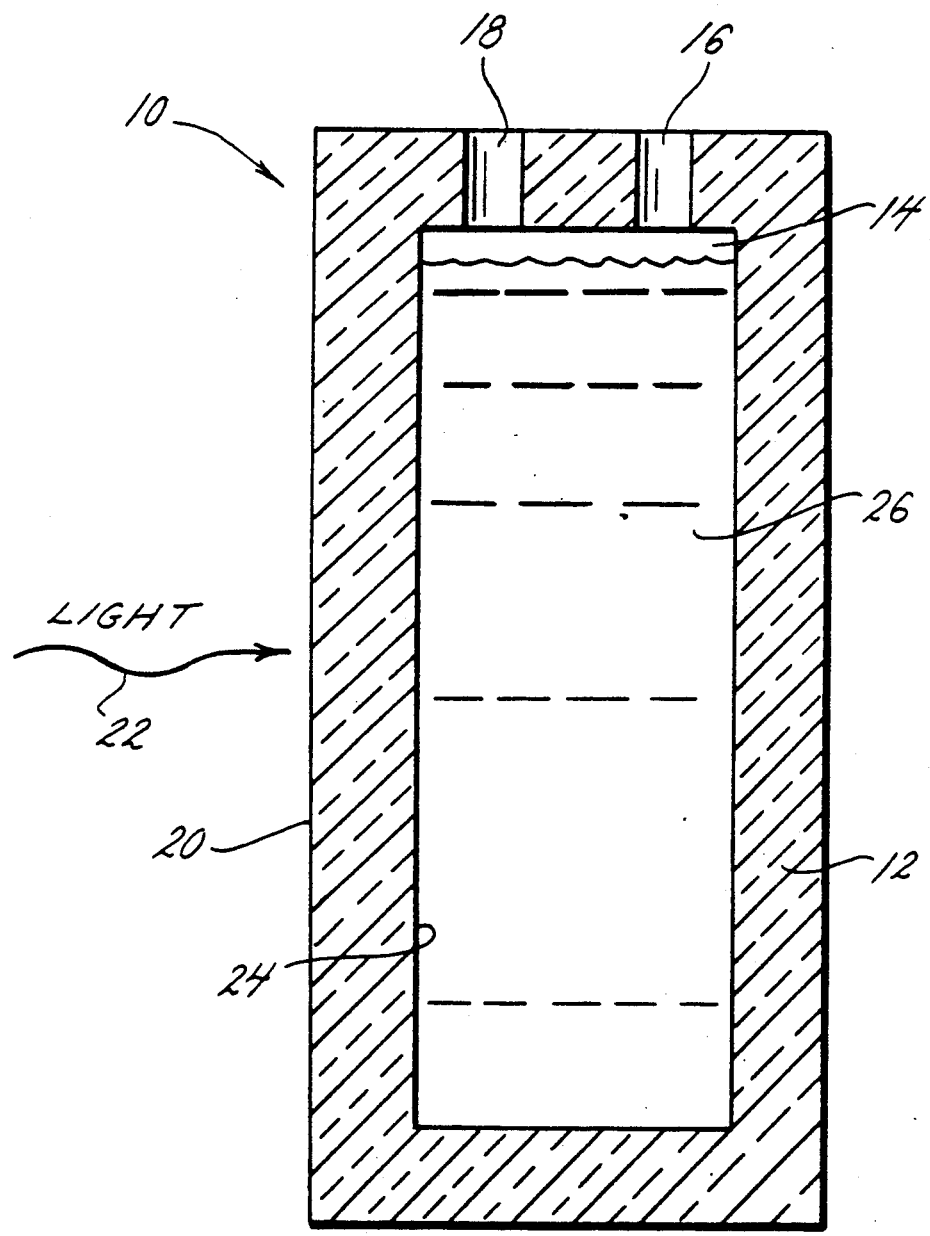

OPTICAL CELL

BACKGROUND OF INVENTION

1. Field of Invention

This invention relates generally to optical filters and shutters for protecting optical devices from excessive energy levels, and more particularly to optical devices reactive to excessive energy levels such that the device transforms from a transmissive device to a blocking device at energy levels above its threshold.

2. Brief Description of the Prior Art

Many applications utilize high energy laser beams such as laser range finding and laser tracking. The detectors used to receive the laser beams need to be protected so as to insure that they will not be destroyed by a blast of laser energy which is above the detector's maximum allowable exposure.

Previously, protective devices utilized optical modulators such as Pockels Cells whose polarization would vary according to the surrounding magnetic field. Also, mechanical shutter systems have been developed which convert a triggering signal into a voltage which drives a piston to close the shutter so as to protect the equipment from being damaged. A mechanical system such as this is disclosed in U.S. Pat. No. 4,515,173 issued to Eugene L. Zimmerman, on May 7, 1985. Such systems had the disadvantages of being either too slow to protect modern sensing devices from high energy sources of light, or too large to be effectively utilized with the sensor. Additionally, some of the systems were only able to be used once since they were functionally destroyed in protecting the sensor.

It is the object of this invention to provide an optical shutter that is optically clear at the sensor frequency, reactive to high energy light sources so as to protect sensors quickly enoughto prevent damage, and completely reusable.

SUMMARY OF THE INVENTION

There is provided by this invention a thermally reactive shutter which can react quickly enough so as to protect a sensor from damaging high energy light signals. The optical shutter is optically clear at the sensor frequency and designed in such a manner so as to be reusable. The time of response for the shutter and the light energy threshold for protection can be set according to the requirements of the application.

BRIEF DESCRIPTION OF THE DRAWINGS

The FIGURE illustrates a sectioned view of the optical shutter having two orifices;

BRIEF DESCRIPTION OF THE PREFERRED EMBODIMENT

Referring to the FIGURE, there is shown an optical shutter incorporating the features of this invention. The shutter 10 has an outer housing 12 enclosing a cavity 14. Two small orifices, 16 and 18, connect the cavity 14 with the external environment. The external surface 20 of the outer housing 12 is polished so as to appear optically clear to impinging light beams such as 22. The internal surface 24 of the outer housing 12, which is the interface between the outer housing 12 and the cavity 14, is frosted so as to diffuse the light beam 22 and to prevent the sensor from receiving a strong signal in a manner hereinafter described. When the cavity 14 is empty, the uneven surface of the frosted internal surface 24 acts as a diffusing or scattering element between the outer housing 12 and the empty cavity 14 which have different indices of refraction. Once the cavity 14 is filled with a fluid 26 whose index of refraction matches the index of refraction of the outer housing 12, the diffusion created by the frosting of the internal surface 24 when the cavity 14 is empty is eliminated and the optical shutter 10 appears clear to the impinging light beam 22. While the cavity 14 is filled with an index-matching fluid 26, the shutter 10 is transmissive since the fluid 26 fills in the irregularities of the uneven internal surface 24 so as to present a continuous optical element of a single index of refraction to the impinging light beam 22. The small orifices, 16 and 18, are used to fill the cavity 14 with the index-matching fluid 26 and also to allow the heated fluid to evaporate.

The normal operation of the optical shutter 10 is to appear optically clear to the impinging light beam 22 so as to allow it to pass through the shutter 10 and to be detected by the sensor. Thus, for normal operation, the cavity 14 is filled with an index-matching fluid 26. When a light beam impinges on the shutter 10 with energy that is above the shutter's threshold, the index-matching fluid 26 will quickly evaporate through the orifices 16 and 18. Once empty, the cavity 14 will diffuse the high energy light beam so as to protect the sensor. The optical shutter 10 can then be used again by simply refilling the cavity 14 with the index-matching fluid 26.

The length of time required for evaporation and thus the response time for protection is determined by the physical properties, such as its boiling point, of the index-matching fluid 26 and the volume of the cavity 14. The threshold energy level of the light beam 22 required to evaporate the index-matching fluid 26 is also determined by the fluid's physical properties, such as its boiling point and the volume of the cavity 14.

Depending on the requirements of the application, the shutter 10 may be constructed as large or as small as the sensor requires and the volume of cavity 14 may be varied to provide the requisite response time so as to protect the sensor. The outer housing 12 may be constructed of various materials such as glass or quartz with different indices of refraction so as to utilize the various physical properties of the different fluids 26 which are used to match the index of refraction of the outer housing 12. The outer housing 12 is typically constructed from two parts which are machined, treated, and joined together to form a complete outer housing 12. An example of the materials utilized in fabricating an optical shutter 10 is to construct the outer housing 12 of an optical glass, such as BK7 with an index of refraction of 1.517. A fluid with a matching index of refraction of 1.517 is diallylthphalate. Fluids, such as benzylacetate or methylbenzoate with indices of refraction of 1.518 and 1.515 respectively, could be used as well. A typical optical shutter 10 has been constructed with a total thickness of 0.003 inches while having a response time for evaporation of the index-matching fluid 26 in the microsecond range.

Although there has been illustrated and described specific detail and structure of operations, it is clearly understood that the same were merely for purposes of illustration and that changes and modifications may be readily made therein by those skilled in the art without departing from the spirit and scope of the inventions.

I claim:

1. An optical shutter, comprising:
   a. an outer housing constructed from a material with a certain index of refraction and having an external polished surface for appearing optically clear at a certain frequency to impinging light beams;
   b. a cavity contained within the outer housing wherein the cell has inner surfaces which are frosted for diffusing and scattering the impinging light beams at the frosted surface;
   c. at least one orifice means for providing a passage between the cavity and an external atmosphere;
   d. a fluid contained within the cavity with an index of refraction equal to that of the outer housing for offsetting the diffusing and scattering of the frosted surfaces of the cell to make the optical shutter appear optically clear at a certain frequency; and
   e. said fluid having a vaporization coefficient wherein at excessive energy levels the fluids vaporizes and escapes from the orifice such that the high energy light beams are diffused and scattered such that the shutter blocks the high energy light beams.

2. An optical shutter as recited in claim 1 wherein the material from which the outer housing is constructed is glass.

3. An optical shutter as recited in claim 1 wherein the material from which the outer housing is constructed is quartz.

4. An optical shutter as recited in claim 1 wherein the fluid is an aliphatic hydrocarbon.